United States Patent
Gao et al.

(10) Patent No.: US 9,516,349 B2
(45) Date of Patent: Dec. 6, 2016

(54) PIXEL-BASED INTRA PREDICTION FOR CODING IN HEVC

(75) Inventors: Wen Gao, West Windsor, NJ (US); Jin Song, Shenzhen (CN); Mingyuan Yang, Shenzhen (CN); Haoping Yu, Carmel, IN (US)

(73) Assignee: Futurewei Technologies, Inc., Plano, TX (US)

( * ) Notice: Subject to any disclaimer, the term of this patent is extended or adjusted under 35 U.S.C. 154(b) by 528 days.

(21) Appl. No.: 13/546,848

(22) Filed: Jul. 11, 2012

(65) Prior Publication Data

US 2013/0016777 A1 Jan. 17, 2013

Related U.S. Application Data

(60) Provisional application No. 61/506,958, filed on Jul. 12, 2011.

(51) Int. Cl.
| | |
|---|---|
| *H04N 19/103* | (2014.01) |
| *H04N 19/90* | (2014.01) |
| *H04N 19/176* | (2014.01) |
| *H04N 19/147* | (2014.01) |
| *H04N 19/46* | (2014.01) |
| *H04N 19/593* | (2014.01) |
| *H04N 19/11* | (2014.01) |

(Continued)

(52) U.S. Cl.
CPC ............ *H04N 19/90* (2014.11); *H04N 19/103* (2014.11); *H04N 19/11* (2014.11); *H04N 19/12* (2014.11); *H04N 19/147* (2014.11); *H04N 19/154* (2014.11); *H04N 19/176* (2014.11); *H04N 19/46* (2014.11); *H04N 19/593* (2014.11)

(58) Field of Classification Search
CPC .................... H04N 19/00696; H04N 19/00684
See application file for complete search history.

(56) References Cited

U.S. PATENT DOCUMENTS

| 2005/0038837 A1 | 2/2005 | Marpe et al. |
| 2006/0013320 A1* | 1/2006 | Oguz ............... H04N 19/61 375/240.27 |

(Continued)

FOREIGN PATENT DOCUMENTS

| CN | 101193301 A | 6/2008 |
| CN | 101820546 A | 9/2010 |

(Continued)

OTHER PUBLICATIONS

Bross, B., et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F803_d6, 229 pages.

(Continued)

*Primary Examiner* — William C Vaughn, Jr.
*Assistant Examiner* — Jerry Jean Baptiste
(74) *Attorney, Agent, or Firm* — Conley Rose, P.C.

(57) ABSTRACT

An apparatus comprising a processor configured to receive a video frame comprising a current block, wherein the current block comprises a plurality of original pixels, compute a plurality of reconstructed pixels based on the original pixels, and use an intra prediction mode to generate a set of prediction pixels based on a set of reconstructed pixels in the plurality of reconstructed pixels.

16 Claims, 13 Drawing Sheets

(51) Int. Cl.
H04N 19/12 (2014.01)
H04N 19/154 (2014.01)

(56) References Cited

U.S. PATENT DOCUMENTS

| | | |
|---|---|---|
| 2008/0131087 A1 | 6/2008 | Lee et al. |
| 2009/0225834 A1 | 9/2009 | Song et al. |
| 2010/0054615 A1 | 3/2010 | Choi et al. |
| 2010/0118943 A1* | 5/2010 | Shiodera ............ H04N 19/105 375/240.12 |
| 2011/0150072 A1 | 6/2011 | Han |
| 2011/0249735 A1* | 10/2011 | Zhao ................... H04N 19/105 375/240.12 |
| 2011/0310967 A1* | 12/2011 | Zhang ................. H04N 19/176 375/240.12 |
| 2012/0082222 A1* | 4/2012 | Wang ................... H04N 19/176 375/240.12 |
| 2012/0269270 A1* | 10/2012 | Chen ................... H04N 19/597 375/240.16 |
| 2014/0341281 A1* | 11/2014 | Bossen et al. .......... 375/240.12 |

FOREIGN PATENT DOCUMENTS

| | | |
|---|---|---|
| EP | 2388999 A2 | 11/2011 |
| WO | 2004064406 A1 | 7/2004 |
| WO | 2011128268 A1 | 10/2011 |

OTHER PUBLICATIONS

Bjontegaard, G., "H.26L Test Model Long Term No. 8 (TML-8) draft0.," ITU-Telecommunications Standardization Sector, Study Group 16, Video Coding Experts Group (VCEG), Question Q.6/SG16(VCEG), VCEG-Nxx, 46 pages.

Davies, T., et al., "Suggestion for a Test Model," Joint Collaborative Team on Video Coding (JCT-VC) of ITU-T SG16 WP3 and ISO/IEC JTC1/SC29/WG11, 1st Meeting: Dresden, DE, Apr. 15-23, 2010, JCTVC-A033, 30 pages.

Gao, W., et al., "A Lossless Coding Solution for HEVC," Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G664r1, 13 pages.

Gao, W., et al., "A Lossless Coding Solution for HEVC," JCTVC-G664-R4, Nov. 21, 2011, 21 pages.

Howard, P., et al., "Fast and Efficient Lossless Image Compression," Data Compression Conference, Mar. 30-Apr. 2, 1993, 10 pages.

Nguyen, T., et al., "Reduced-Complexity Entropy Coding of Transform Coefficient Levels using a Combination of VLC and PIPE," Joint Collaborative Team on Video Coding (JCT-VC) of ITU-T SG16 WP3 and ISO/IEC JTC1/SG29/WG11, 4th Meeting: Daegu, KR, Jan. 20-28, 2011, JCTVC-D336, 8 pages.

Wiegand, T., "Working Draft No. 2, Revision 0 (WD-2)," Joint Video Team (JVT) of ISO/IEC MPEG and ITU-T VCEG, Pattaya, Thailand, Dec. 3-7, 2001, JVT-B118, 105 pages.

Ye, Y., et al., "Improved H.264 Intra Coding Based on Bi-Directional Intra Prediction, Directional Transform, and Adaptive Coefficient Scanning," IEEE International Conference on Image Processing, 2008, ICIP, Oct. 12-15, 2008, pp. 2116-2119.

Zhang, N., et al., "Spatial Prediction Based Intra-Coding," 2004 IEEE International Conference on Multimedia and Expo (ICME), Jun. 27-30, 2004, pp. 97-100.

Foreign Communication From a Counterpart Application, PCT Application No. PCT/US2012/063428, International Search Report dated Apr. 4, 2013, 8 pages.

Foreign Communication From a Counterpart Application, PCT Application No. PCT/US2012/063428, Written Opinion dated Apr. 4, 2013, 10 pages.

Foreign Communication From a Counterpart Application, PCT Application No. PCT/US2012/063427, International Search Report dated Apr. 4, 2013, 8 pages.

Foreign Communication From a Counterpart Application, PCT Application No. PCT/US2012/063427, Written Opinion dated Apr. 4, 2013, 9 pages.

Nguyen, T., et al., "Reduced-Complexity Entropy Coding of Transform Coefficient Levels Using a Combination of VLC and PIPE," Joint Collaborative Team on Video Coding (JCT-VC) of ITU-T SG 16 WP 3 and ISO/IEC JTC1/SC29/WG11, JCTVC-D336, 4th Meeting, Daego, Korea, Jan. 20-28, 2011, 8 pages.

Wiegand, T., et al. "WD3: Working Draft 3 of High-Efficiency Video Coding," Joint Collaborative Team on Video Coding (JCT-VC) of ITU-T SG 16 WP 3 and ISO/IEC JTC1/SC29/WG11, JCTVC-E603, 5th Meeting, Geneva, Switzerland, Mar. 16-23, 2011, 223 pages.

"Series H: Audiovisual and Multimedia Systems, Infrastructure of Audiovisual Services—Coding of Moving Video, Advanced Video Coding for Generic Audiovisual Services," ITU-T H.264, Nov. 2007, 564 pages.

Richardson, I.E.G., "H264/MPEG-4 Part 10 White Paper—Prediction of Intra Macroblocks," XP002281494, www.vcodex.com, Apr. 30, 2003, 6 pages.

Foreign Communication From a Related Counterpart Application, PCT Application PCT/US2012/046287, International Search Report dated Oct. 12, 2012, 6 pages.

Foreign Communication From a Related Counterpart Application, PCT Application PCT/US2012/046287, Written Opinion dated Oct. 12, 2012, 11 pages.

Choi, J., et al., "H.264/AVC Based Near Lossless Intra Codec Using Line-Based Prediction and Modified Cabac," IEEE International Conference on Multimedia and Expo (ICME), Jul. 11, 2011, 5 pages.

Foreign Communication From a Counterpart Application, European Application No. 12735763.0, European Oral Proceedings dated Oct. 15, 2015, 11 pages.

Partial English Translation and Abstract of Chinese Patent Application No. CN101820546, Apr. 15, 2016, 6 pages.

Bi, H., "New generation video compression coding standard—H264/AVC," May 31, 2005, 5 pages.

English Translation of Bi, H., "New generation video compression coding standard—H264/AVC," May 31, 2005, 5 pages.

Foreign Communication From a Counterpart Application, Chinese Application No. 201280034806.1, Chinese Office Action dated Apr. 6, 2016, 9 pages.

Foreign Communication From a Counterpart Application, Chinese Application No. 201280034806.1, Chinese Search Report dated Mar. 24, 2016, 2 pages.

* cited by examiner

| XY(0) | X(0) | X(1) | X(2) | X(3) |
|---|---|---|---|---|
| Y(0) | Z(0, 0) | Z(0, 1) | Z(0, 2) | Z(0, 3) |
| Y(1) | Z(1, 0) | Z(1, 1) | Z(1, 2) | Z(1, 3) |
| Y(2) | Z(2, 0) | Z(2, 1) | Z(2, 2) | Z(2, 3) |
| Y(3) | Z(3, 0) | Z(3, 1) | Z(3, 2) | Z(3, 3) |

FIG. 3

|       | X(0) | X(1) | X(2) | X(3) |
|-------|------|------|------|------|
| XY(0) | ↓    | ↓    | ↓    | ↓    |
| Y(0)  | ↓    | ↓    | ↓    | ↓    |
| Y(1)  | ↓    | ↓    | ↓    | ↓    |
| Y(2)  | ↓    | ↓    | ↓    | ↓    |
| Y(3)  | ↓    | ↓    | ↓    | ↓    |

FIG. 4

PIXEL-BASED INTRA PREDICTION FOR CODING IN HEVC

CROSS-REFERENCE TO RELATED APPLICATIONS

The present application claims priority to U.S. Provisional Patent Application No. 61/506,958 filed Jul. 12, 2011 by Wen Gao et al. and entitled "Additional Lossless Coding Tools for Compound Video", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed before being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, improved compression and decompression techniques that improve image quality at the expense of little to no increase in bit-rate are desirable.

SUMMARY

In one embodiment, the disclosure includes an apparatus comprising a processor configured to receive a video frame comprising a current block, wherein the current block comprises a plurality of original pixels, compute a plurality of reconstructed pixels based on the original pixels, and use an intra prediction mode to generate a set of prediction pixels based on a set of reconstructed pixels in the plurality of reconstructed pixels.

In another embodiment, the disclosure includes a method comprising receiving a video frame comprising a current block, wherein the current block comprises a plurality of original pixels, compute a plurality of reconstructed pixels based on the original pixels, and using an intra prediction mode to generate a set of prediction pixels based on a set of reconstructed pixels in the plurality of reconstructed pixels.

In another embodiment, the disclosure includes an apparatus comprising a processor configured to receive a bitstream comprising an encoded residual block, decode the encoded residual block, wherein the decoded residual block comprises a plurality of residual pixels, and compute a reconstructed block based on the plurality of residual pixels, wherein the reconstructed block comprises a plurality of reconstructed pixels, wherein computing the reconstructed block includes using an intra prediction mode to generate a set of prediction pixels based on a set of reconstructed pixels in the reconstructed block.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a diagram of an embodiment of a 4×4 current block and some external reference pixels.

FIG. 4 is a diagram of an embodiment of an intra prediction scheme in a vertical mode.

DETAILED DESCRIPTION

Figure 1:
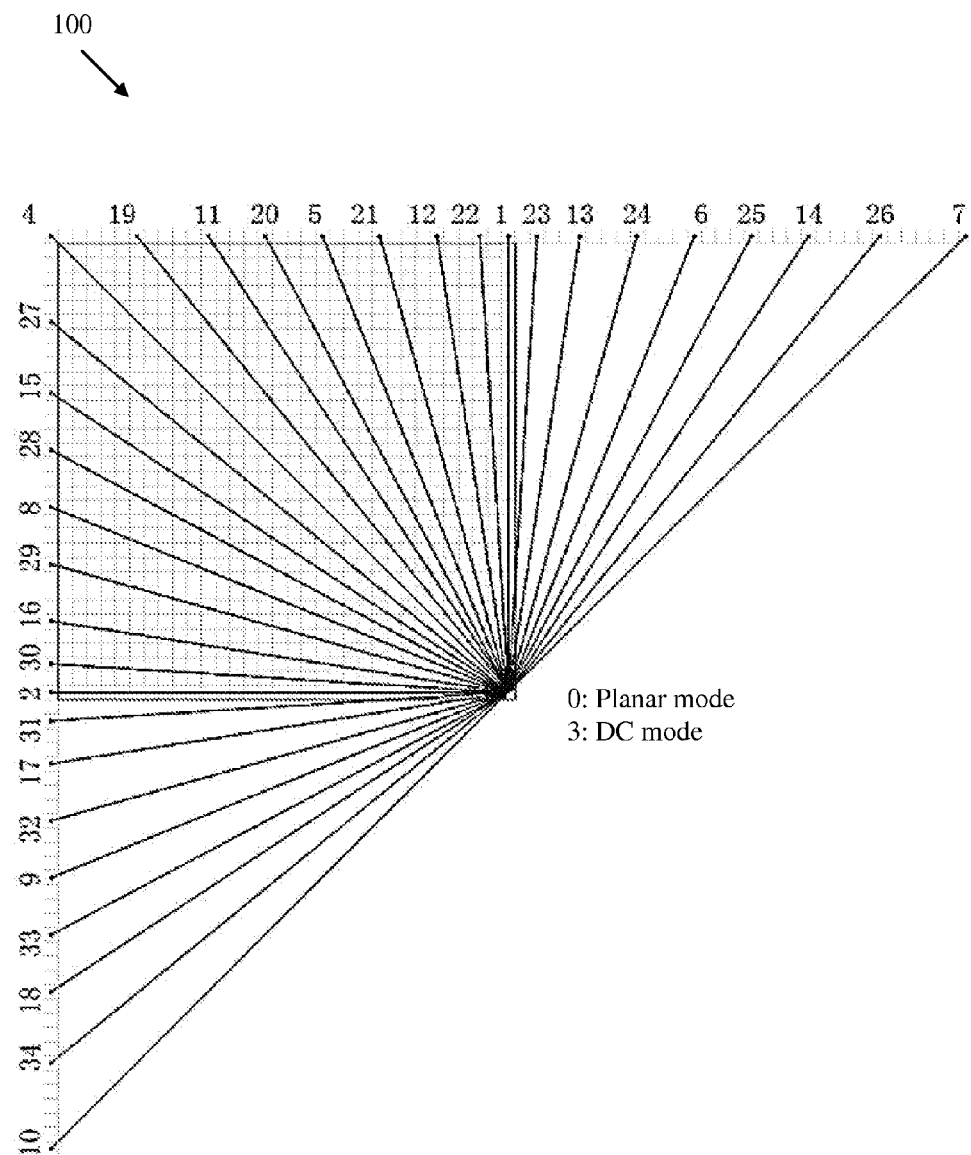
FIG. 1 is a diagram of a plurality of intra prediction modes.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . or 255) that represents an image quality or characteristic, such as luminance (luma) or chrominance (chroma), at the corresponding reference point. In use, an image or video frame may comprise a large amount of pixels (e.g., 2,073,600 pixels in a 1920×1080 frame), thus it may be cumbersome and inefficient to encode and decode (referred to hereinafter simply as code) each pixel independently. To improve coding efficiency, a video frame is usually broken into a plurality of rectangular blocks or macroblocks, which may serve as basic units of processing such as prediction, transform, and quantization. For example, a typical N×N block may comprise $N^2$ pixels, where N is an integer greater than one and is often a multiple of four.

In working drafts of the International Telecommunications Union (ITU) Telecommunications Standardization Sector (ITU-T) and the International Organization for Standardization (ISO)/International Electrotechnical Commission (IEC) High Efficiency Video Coding (HEVC), which is poised to be a future video standard, new block concepts have been introduced. For example, coding unit (CU) may refer to a sub-partitioning of a video frame into rectangular blocks of equal or variable size. In HEVC, a CU may replace a macroblock structure of previous standards. Depending on a mode of inter or intra prediction, a CU may comprise one or more prediction units (PUs), each of which may serve as a basic unit of prediction. For example, for intra prediction, a 64×64 CU may be symmetrically split into four 32×32 PUs. For another example, for an inter prediction, a 64×64 CU may be asymmetrically split into a 16×64 PU and a 48×64 PU. Similarly, a PU may comprise one or more transform units (TUs), each of which may serve as a basic unit for transform and/or quantization. For example, a 32×32 PU may be symmetrically split into four 16×16 TUs. Multiple TUs of one PU may share a same prediction mode, but may be transformed separately. Herein, the term block may generally refer to any of a macroblock, CU, PU, or TU.

Within a video frame or slice, a pixel may be correlated with other pixels within the same frame such that pixel values within a block or across some blocks may vary only slightly and/or exhibit repetitious textures. Modern methods of video-compression exploit these spatial correlations using various techniques which may be known collectively as intra-frame prediction (or in short as intra prediction). Intra-frame prediction may reduce spatial redundancies between neighboring blocks in the same frame, thereby compressing the video data without greatly reducing image quality.

In practice, intra-frame predication may be implemented by video encoders/decoders (codecs) to interpolate a prediction block (or predicted block) from one or more previously coded/decoded neighboring blocks, thereby creating an approximation of the current block. Hence, the encoder and decoder may interpolate the prediction block independently, thereby enabling a substantial portion of a frame and/or image to be reconstructed from the communication of a relatively few number of reference blocks, e.g., blocks positioned in (and extending from) the upper-left hand corner of the frame. However, intra-frame prediction alone may not reproduce an image of sufficient quality for modern video, and consequently an error correction message, e.g., a residual message, may be communicated between the encoder and decoder to correct differences between the prediction block and the current block. For instance, an encoder may subtract the prediction block from the current block, or vice versa, to produce a residual block, which then may be transformed, quantized, and scanned before being coded into the coded data stream. Upon reception of the coded data stream, a decoder may add the reconstructed residual block to the independently generated prediction block to reconstruct the current block. Although the reconstructed current block may be an imperfect version of the original current block, their differences may be hardly perceptible to the human eye. Thus, substantial bit savings may be obtained without significantly degrading the quality of the reconstructed image.

The residual block may comprise few differences between the prediction block and the current block, and therefore many of the residual block's discrete values, e.g., pixel data, may comprise zero and/or near-zero coefficients, e.g., in areas where the prediction block is identical and/or near-identical to the current block. Furthermore, transformation, quantization, and/or scanning of the residual block may remove many of the zero and/or near-zero coefficients from the data stream, thereby resulting in further compression of the video data. Consequently, coding efficiencies may result from more accurate predictions of the original image. To harness these coding efficiencies, conventional video/image coding standards may improve prediction accuracy by using a plurality of prediction modes during intra prediction, e.g., each of which may generate a unique texture.

FIG. 1 illustrates a diagram of a plurality of intra prediction modes 100 (also referred hereafter as intra modes), which may be used, for example, in a HEVC unified intra prediction (UIP) scheme. For luminance blocks, the intra prediction modes 100 may comprise up to 35 intra prediction modes, which may include 33 directional modes and 2 non-directional modes, such as a Direct Current (DC) prediction mode and a planar prediction mode. In use, an encoder may use a rate-distortion optimization (RDO) process to select a prediction mode that generates the most accurate prediction for each current block. For example, the sum of absolute errors (SAE) may be calculated for each mode in the intra prediction modes 100, and the one with the least SAE may be selected. In general, more accurate intra prediction may be resulted from a larger number of intra prediction modes. For example, recent research has shown that conventions using 35 intra-frame prediction modes, such as the intra prediction modes 100, may more accurately predict complex textures than conventions using fewer prediction modes, such as ITU-T H.264/advanced video coding (AVC), which uses only 9 intra prediction modes. While FIG. 1 shows 35 intra prediction modes, depending on block-size and/or the intra prediction scheme, any other number of prediction modes may also be used.

In current intra prediction schemes, pixels surrounding a current block may be used as reference pixels (or prediction samples) to generate a prediction block. The quality of intra prediction may be affected by factors such as block size and prediction mode. For example, as the size of the prediction block increases, pixels in the prediction block that are farther away from the reference pixels may have less spatial correlation with the reference pixels, thus the prediction accuracy of the father pixels may be degraded. This degradation of prediction accuracy may result in more residual data, which in turn may increase the data to be encoded, stored, and/or transmitted.

Disclosed herein are systems and methods for improved intra prediction in video coding. The disclosure provides an intra prediction scheme that not only uses pixels in neighboring blocks as external reference pixels but also uses pixels within a current block as internal reference pixels. In an embodiment, an initial set of prediction pixels may be generated based on a plurality of external reference pixels. Depending on an intra prediction mode, the initial set of prediction pixels may be located in a row, a column, or both of a current prediction block. The initial set of prediction pixels may be subtracted from an initial set of corresponding original pixels of the current block, or vice versa, thereby generating an initial set of residual pixels. Further, to generate a continuing set of residual pixels, a plurality of internal reference pixels may be used, which may be reconstructed versions of original pixels. For example, in a vertical mode of intra prediction, the initial set or top row of the current block may be predicted based on a row of an upper block. The second row may be predicted from a reconstructed version of the top row, the third row may be predicted from a reconstructed version of the second row to the top, and so forth. Depending on whether a coding scheme is lossless or lossy, the reconstructed pixels may be a lossless or lossy version of the original pixels. In the present disclosure, the internal reference pixels may immediately precede the continuing set of prediction pixels, thus a prediction distance may remain one regardless of a size of the current block. Due to the spatial proximity of the external/internal reference pixels and their predicted pixels, the disclosed intra prediction systems and method may provide more prediction accuracy compared to current intra prediction schemes. The pixel-based intra prediction scheme disclosed herein may be implemented in a variety of encoding and decoding schemes, such as a transform bypass coding scheme (i.e., bypassing a transform step and a quantization step), a transform without quantization coding scheme (i.e., bypassing a quantization step), or a quantization without transform coding scheme (i.e., bypassing a transform step).

Figure 2:
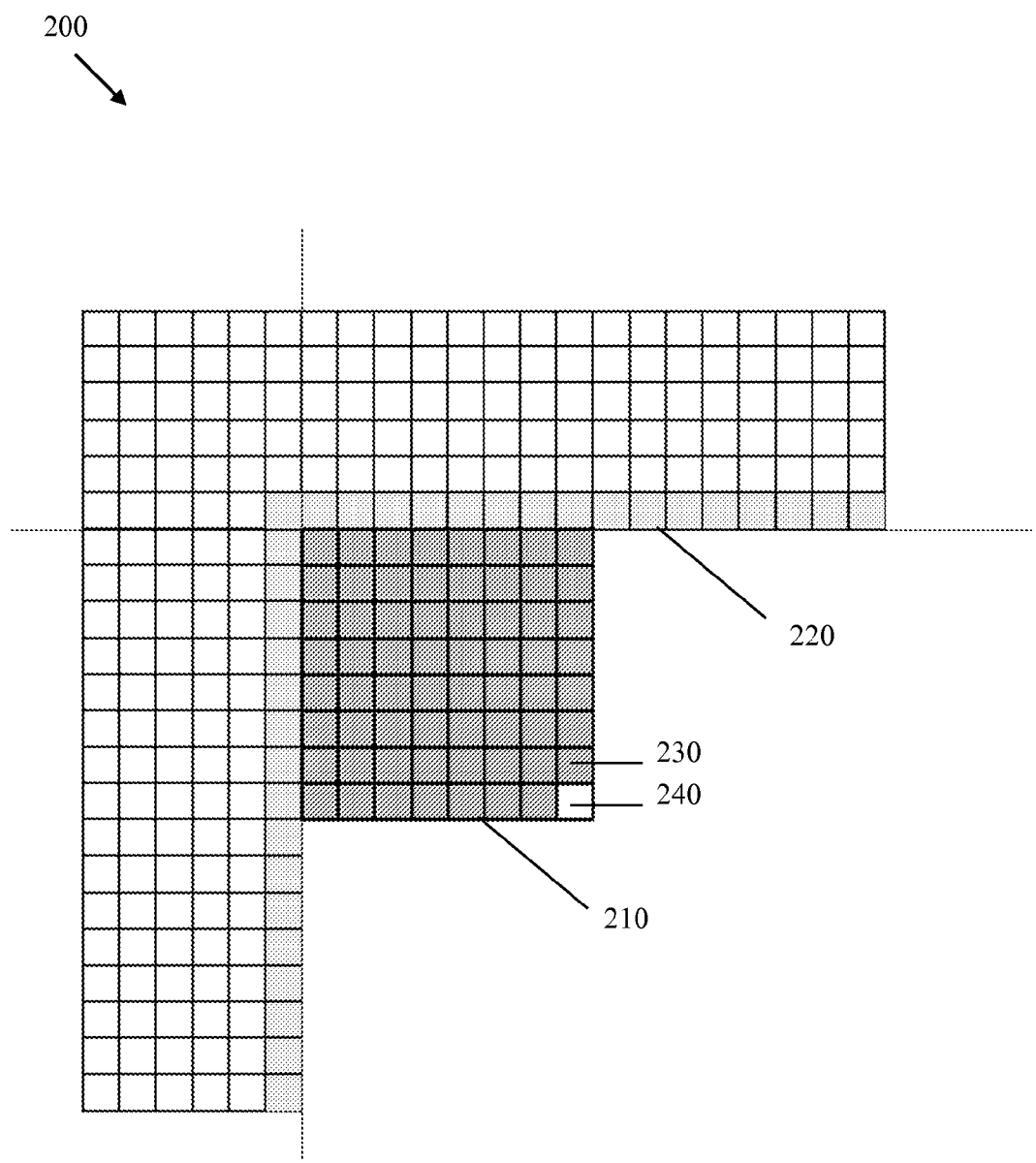
FIG. 2 is a diagram of an embodiment of a pixel-based intra prediction scheme.

FIG. 2 shows an embodiment of a pixel-based intra prediction scheme 200. To predict an N×N current block 210, the intra prediction scheme 200 may generate an N×N prediction block. Suppose, for the purpose of illustration, that the current block 210 has a size of 8×8 as shown in FIG. 2. Since pixels surrounding the current block 210 may have already been coded prior to the current block 210, they may be used to predict the current block 210. Particularly, a number of pixels located in a column left to (and adjacent) the current block 210, and in a row above (and adjacent) the current block 210 may be used as reference pixels of intra prediction. As these pixels are located outside the current block 210, they may be referred to hereinafter as external reference pixels 220, which are marked as downward-hatched pixels in FIG. 2. Since up to 35 intra prediction modes may be used (e.g., shown in FIG. 1), the number of external reference pixels 220 may be up to 4N+1 for an N×N prediction block. For example, for the 8×8 current block 210, there may be up to 33 external reference pixels 220 as shown in FIG. 2. While FIG. 2 shows a square current block 210, it should be understood that a disclosed pixel-based intra prediction scheme may also be used to predict non-square blocks, which may be used in a short distance intra prediction (SDIP) scheme. In the present disclosure, since all rows may be predicted from their adjacent upper row, the distance between prediction pixels and reference pixels may remain one regardless of the size of the current block. Thus, accuracy of intra prediction may be improved.

In contrast with current intra prediction schemes which may generate all prediction pixels (or predicted pixels) of the current block in a parallel fashion, the disclosed intra prediction may generate prediction pixels in a sequential fashion or set-by-set. In an embodiment, a portion of the external reference blocks 220 may be used to generate an initial set of prediction pixels. The initial set herein may refer to a row and/or a column of pixels that are predicted first according to a particular intra mode. For example, in a vertical mode (numbered as mode 1 in FIG. 1), the initial set may be the top row of the current block 210. For another example, in a horizontal mode (numbered as mode 2 in FIG. 1), the initial set may be the left column of the current block 210. For yet another example, in a right-downward diagonal prediction (numbered as mode 4 in FIG. 1), the initial set may be the top row and the left column of the current block 210.

After obtaining the initial set of prediction pixels, the initial set of residual or differential pixels may be generated by subtracting original pixel values from the prediction values, or vice versa. Then, continuing sets of prediction pixels may be based on reference pixels located within the current block 210, which may be referred to hereafter as internal reference pixels 230. It should be noted that, to avoid potential decoding drift, same external/internal reference pixels should be used in an encoder and a decoder. Thus, instead of original pixels, reconstructed pixels may be used as reference pixels. Since reconstructed pixels are converted from the original pixels through a same set of procedures in the encoder and decoder, it may be ensured that reference pixels are the same.

The continuing sets of prediction pixels may be generated based on a reconstructed version of the initial set of pixels. For example, in a vertical mode, the second row to the top may be predicted from a reconstructed top row, the third row to the top may be predicted from a reconstructed second row to the top, and so forth. Taking into account all prediction modes, all pixels in the current block, except one in a bottom-right corner, may be potentially used as internal reference pixels. As shown in FIG. 2, the internal reference pixels 230 are marked as upward-hatched pixels, and the bottom-right corner pixel 240 is not hatched.

FIG. 3 shows an embodiment of a 4×4 current block (e.g., a PU) and some external reference pixels. Original pixels values of the current block are denoted as $Z(i,j)$, where i is a row index between 0 and 3, and j is a column index between 0 and 3. Pixels located in a bottom row of a upper block are denoted as $X(j)$ for $j=0, \ldots, 3$, and pixels located in a right column of a left block are denoted as $Y(i)$ for $i=0, \ldots 3$. A bottom-right corner pixel of a third neighboring block is denoted as $XY(0)$. Prediction pixels, denoted as $P(i,j)$ for $i=0, \ldots, 3$ and $j=0, \ldots, 3$, may be generated for the current block, which may be an estimated version of the original pixels $Z(i,j)$. Intra prediction may be fulfilled in any of a plurality of intra prediction modes (e.g., as the plurality of intra modes 100 in FIG. 1).

Figure 4:
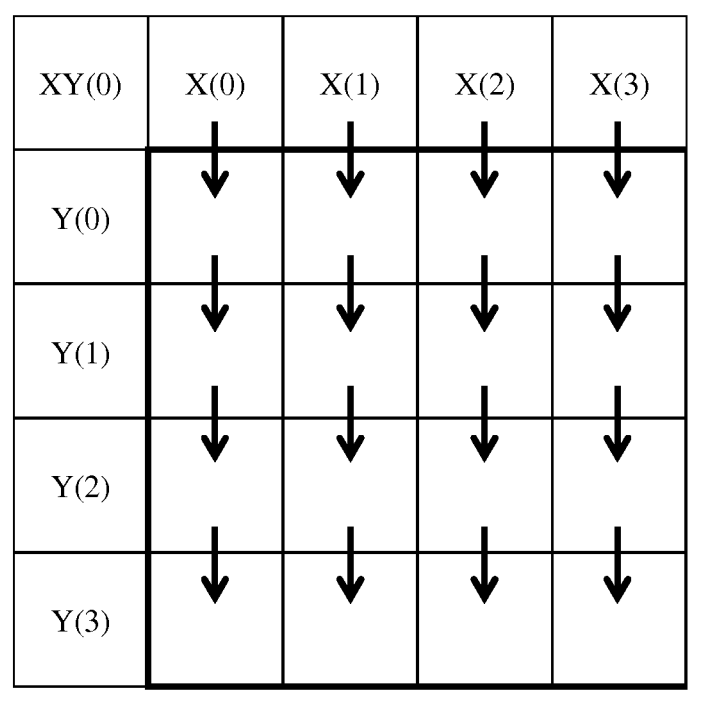

FIG. 4 shows an embodiment of an intra prediction scheme in a vertical mode (numbered as mode 1 in FIG. 1). In the vertical mode, an initial set (in this case, a top or 0-th row according to i denotations) of the current block may be predicted from its upper block as $P(0,j)=X(j)$ for $j=0 \ldots, 3$. The initial set may be subtracted from the original pixels $Z(0,j)$, generating a set of residual or differential pixels (denoted as $D(0,j)$), or vice versa. Mathematically, $D(0,j)=Z(0,j)-P(0,j)$ or $D(0,j)=P(0,j)-Z(0,j)$. The set of residual pixels may be processed and used to generated a set of reconstructed pixels (denoted as $R(0,j)$), which may be an exact or lossy version of the set of original pixels $Z(0,j)$. As mentioned above, the reconstructed pixels, rather than the original pixels, may be used for further prediction to avoid coding drift. A continuing set (in this case, any of the 1th to 3rd rows) of the current block may be predicted from a reconstructed row above as $P(i,j)=R(i-1,j)$ for $i=1, 2, 3$ and $j=0, \ldots 3$. This intra prediction scheme may be different from current intra prediction schemes, in which all rows of the current block may be predicted from its upper block as $P(i,j)=X(j)$ for $i=0, \ldots, 3$ and $j=0 \ldots, 3$. In the present disclosure, since all rows may be predicted from their adjacent upper row, the distance between prediction pixels and reference pixels may remain one regardless of the size of the current block. As a result, accuracy of intra prediction may be improved.

Although not shown in FIG. 4, other intra prediction modes may be implemented using a scheme similar to the vertical mode. For example, if a horizontal mode (numbered as mode 1 in FIG. 1) is used, the 0-th column of the current block may be predicted from its left neighboring block as $P(i,0)=Y(i)$ for $i=0 \ldots, 3$. Others columns (i.e., 1th to 3rd columns) in the current block may be predicted from their left columns as $P(i,j)=R(i,j-1)$ for $i=0, \ldots, 3$ and $j=1, 2, 3$. In the horizontal mode, the disclosed pixel-based intra prediction scheme may be different from current intra prediction schemes, in which all columns of the current block may be predicted from the left block as $P(i,j)=Y(i)$ for $i=0, \ldots, 3$ and $j=0 \ldots, 3$. For another example, if a right-downward diagonal mode (numbered as mode 4 in FIG. 1) is used, the initial set including the 0-th row and the 0th column of the current block may be predicted from pixels in three neighboring block as $P(0,0)=XY(0)$, $P(0,j+1)=X(j)$, and $P(i+1,0)=Y(i)$ for $i=0, 1, 2$ and $j=0, 1, 2$. Others rows and columns of the current block may be predicted from their upper-left neighboring pixels as $P(i+1,j+1)=R(i,j)$ for $i=0, 1, 2$ and $j=0, 1, 2$.

As mentioned previously, the pixel-based intra prediction scheme disclosed herein may be implemented in a variety of coding schemes. Depending on the application, lossy (i.e., with distortion or information loss) and/or lossless (i.e., no distortion or information loss) encoding may be implemented in a video encoder. For example, when encoding a video frame or slice, the video encoder may bypass or skip a transform step and/or a quantization step for all or some of blocks in the video frame. Herein, a lossy encoding mode may include quantization without transform encoding (i.e., bypassing a transform step), and the lossless encoding mode may include transform bypass encoding (i.e., bypassing a transform step and a quantization step) and transform without quantization encoding (i.e., bypassing a quantization step). Likewise, based on information contained in a received bitstream, a video decoder may decode a video frame using a lossless mode and/or a lossy mode. The lossy decoding mode may include quantization without transform decoding, and the lossless decoding mode may include transform bypass decoding and transform without quantization decoding.

Depending on whether a coding scheme is lossless or lossy, a reconstructed pixel may be an exact or lossy version of an original pixel. Since the reconstructed pixel may be used as a reference pixel for intra prediction of other pixels, accuracy of intra prediction may vary with the lossless/lossy scheme. Further, since coding modules used in a loss and a lossy scheme may be different, the disclosed pixel-based intra prediction may be implemented differently. In the interest of clarity, the application of various embodiments of pixel-based intra prediction in lossy and lossless coding schemes are described in paragraphs below.

Figure 5:
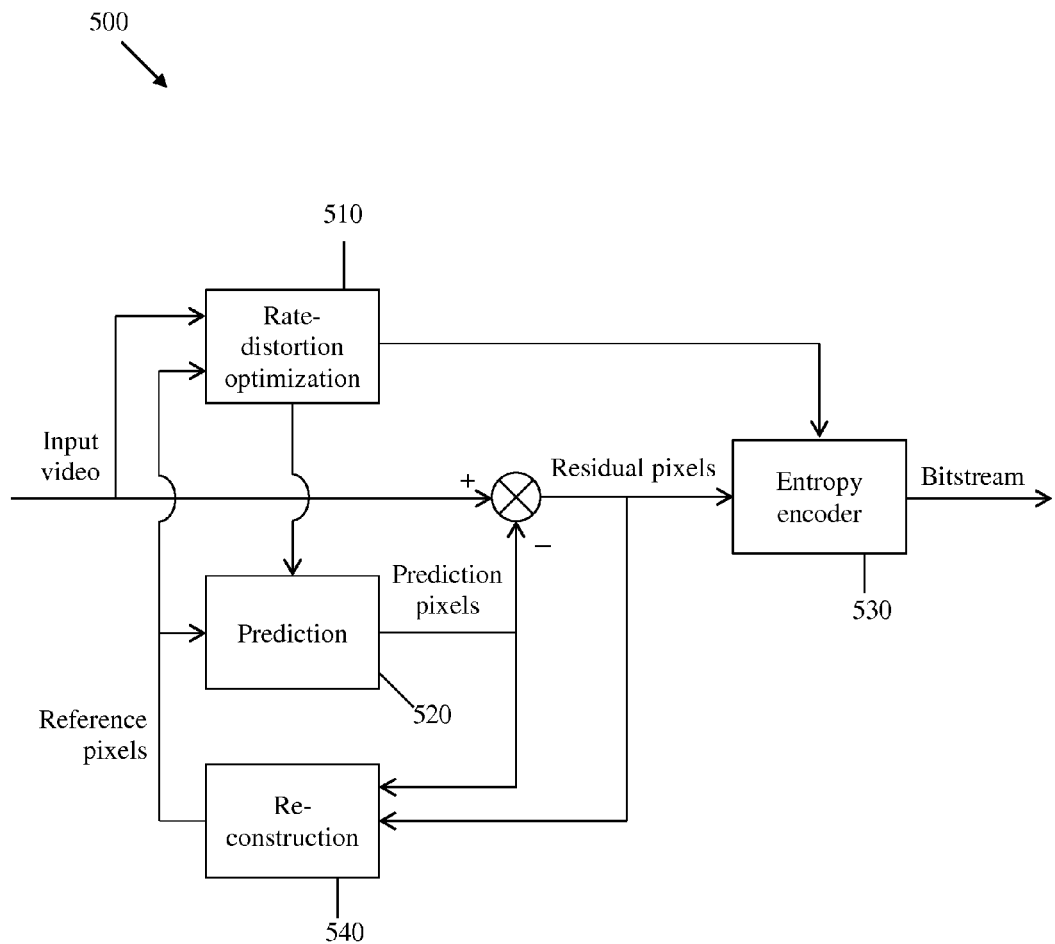
FIG. 5 is a schematic diagram of an embodiment of a transform bypass encoding scheme.

FIG. 5 illustrates an embodiment of a transform bypass encoding scheme 500, which may be implemented in a video encoder. The transform bypass encoding scheme 500 may comprise a rate-distortion optimization (RDO) module 510, a prediction module 520, an entropy encoder 530, and a reconstruction module 540 arranged as shown in FIG. 5. In operation, an input video comprising a sequence of video frames (or slices) may be received by the encoder. Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 510 may be configured to make logic decisions for one or more of other modules. For example, the RDO module 510 may coordinate the prediction module 520 by determining an optimal intra prediction mode for a current block (e.g., a PU) from a plurality of available prediction modes. The RDO module may select an optimal intra mode based on various algorithms. For example, the RDO module 510 may calculate a sum of absolute error (SAE) for each prediction mode, and select a prediction mode that results in the smallest SAE. However, pixel-based intra prediction may be considered as one of the intra modes regardless of the metric used by the RDO.

Based on logic decisions made by the RDO module 510, the prediction module 520 may utilize both external reference pixels and internal reference pixels to generate prediction pixels for the current block. Each prediction pixel may be subtracted from a corresponding original pixel in the current block, or vice versa, thereby generating a residual pixel. To facilitate continuous encoding of pixels, the residual pixels may also be fed into the reconstruction module 540, which may generate reconstructed pixels to serve as reference pixels for intra prediction of future pixels.

Then, after all residual pixels have been generated for the current block, the residual pixels may be scanned, and non-zero residual pixels may be encoded by the entropy encoder 530 into an encoded bitstream. The entropy encoder 530 may employ any entropy encoding scheme, such as context-adaptive binary arithmetic coding (CABAC) encoding, exponential Golomb encoding, or fixed length encoding, or any combination thereof. In the transform bypass encoding scheme 500, since the residual block is encoded without a transform step or a quantization step, no information loss may be induced in the encoding process. It should be noted that FIG. 5 may be a simplified illustration of a video encoder, thus it may only include a portion of modules present in the encoder. Other modules (e.g., filter, scanner, and transmitter), although not shown in FIG. 5, may also be included to facilitate video encoding. Prior to transmission from the encoder, the encoded bitstream may be further configured to include other information, such as video resolution, frame rate, block partitioning information (sizes, coordinates), prediction modes, etc., so that the encoded sequence of video frames may be properly decoded.

When encoding an N×N current block via the transform bypass encoding scheme 500, since a residual pixel (i.e., $D(i,j)$ for $i=0, \ldots, N-1$ and $j=0 \ldots, N-1$) may be directly added to a prediction pixel (i.e., $P(i,j)$) to generate a reconstructed pixel (e.g., $R(i,j)=D(i,j)+P(i,j)$) without any additional processing, no distortion or information loss may be induced in the reconstruction process. Consequently, the reconstructed pixel ($R(i,j)$) may be exactly the same with the original pixel ($Z(i,j)$). In an embodiment, an initial set of predicted pixels may be generated based on a plurality of external reference pixels, while a continuing set of predicted pixels may be generated based on a previous set of internal reference pixels, which are reconstructed pixels. For example, in a vertical intra mode, the 0-th row of the current block may be predicted from an upper block as $P(0,j)=X(j)$ for $j=0 \ldots, N-1$. The prediction pixels in the 0-th row may be subtracted from the original pixels $Z(0,j)$, generating a set of residual pixels $D(0,j)$. Further, the set of residual pixels may be directly used to generated a set of reconstructed pixels R(0,j). A continuing row may be predicted from a reconstructed row above as P(i,j)=R(i−1,j) for i=1, . . . , N−1 and j=0, . . . , N−1.

Figure 6:
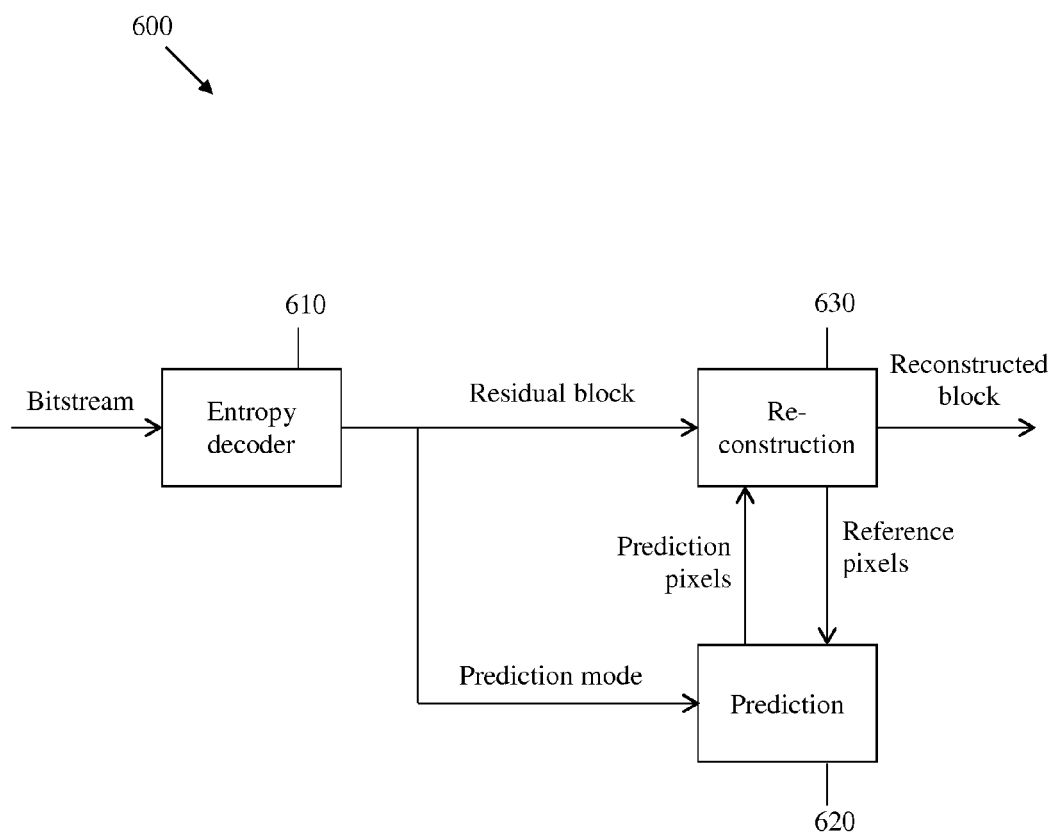
FIG. 6 is a schematic diagram of an embodiment of a transform bypass decoding scheme.

FIG. 6 illustrates an embodiment of a transform bypass decoding scheme 600, which may be implemented in a video decoder. The transform bypass decoding scheme 600 may correspond to the transform bypass encoding scheme 500, and may comprise an entropy decoder 610, a prediction module 620, and a reconstruction module 630 arranged as shown in FIG. 6. In operation, an encoded bitstream containing information of a sequence of video frames may be received by the entropy decoder 610, which may decode the bitstream to an uncompressed format. The entropy decoder 610 may employ any entropy decoding algorithm, such as CABAC decoding, exponential Golomb decoding, or fixed length encoding, or any combination thereof.

For a current block being decoded, a residual block may be generated after the execution of the entropy decoder 610. In addition, information containing a prediction mode of the current block may also be decoded by the entropy decoder 610. Then, based on the prediction mode as well as a plurality of external reference pixels located in one or more previously decoded neighboring blocks, the prediction module 620 may generate an initial set of prediction pixels. Then, the reconstruction module 630 may combine the initial set of prediction pixels with a corresponding set of residual pixels to generate a set of reconstructed pixels. The reconstructed pixels may also serve as reference pixels for decoding of continuing sets of pixels. Specifically, by using the initial set of reconstructed pixels, a second set of prediction pixels may be generated. Thus, the second set of prediction pixels may be added to a second set of residual pixels to obtain a second set of reconstructed pixels. This iterative process may continue until all reconstructed pixels for the current block have been obtained. Then, the decoder may proceed to reconstruct a next block.

In use, if an original block is encoded and decoded using lossless schemes, such as the transform bypass encoding scheme 500 and the transform bypass decoding scheme 600, it is possible that no information loss may be induced in the entire coding process. Thus, barring distortion caused during transmission, a reconstructed block may be exactly the same with the original block.

Figure 7:
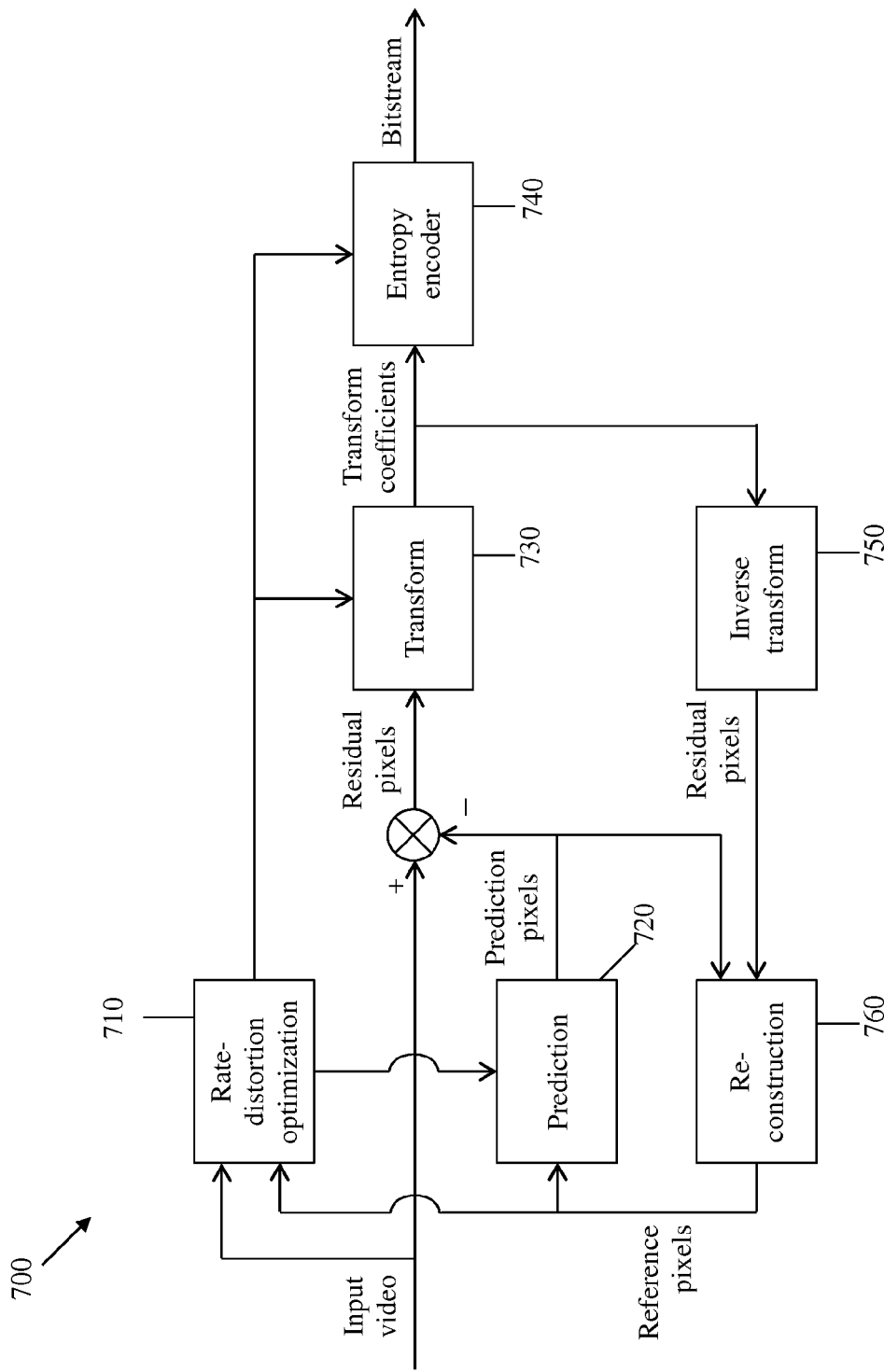
FIG. 7 is a schematic diagram of an embodiment of a transform without quantization encoding scheme.

During lossless coding of certain blocks in a video frame, sometimes it may be desirable to include a transform step into the coding process. For example, for some blocks of a text region, an added transform step may generate a shorter bitstream compared to a transform bypass coding scheme. FIG. 7 illustrates an embodiment of a transform without quantization encoding scheme 700, which may comprise a RDO module 710, a prediction module 720, a transform module 730, an entropy encoder 740, an inverse transform module 750, and a reconstruction module 760. Some aspects of the transform without quantization encoding scheme 700 may be the same or similar to the transform bypass encoding scheme 500 in FIG. 5, thus the similar aspects will not be further described in the interest of clarity.

The transform without quantization encoding scheme 700 may be implemented in a video encoder, which may receive an input video comprising a sequence of video frames. The RDO module 710 may be configured to control one or more of other modules, and may be the same or similar to the RDO module 510 in FIG. 5. Based on logic decisions made by the RDO module 710, the prediction module 720 may utilize both external and internal reference pixels to generate prediction pixels for a current block. Each prediction pixel (P(i,j)) may be subtracted from a corresponding original pixel in the current block, or vice versa, thereby generating a residual pixel. The prediction module 720 may be the same or similar to the prediction module 520 in FIG. 5.

An initial set of residual pixels may be generated by the prediction module 720 based on a plurality of external reference pixels. Then, the initial set of residual pixels may be first transformed from a spatial domain to a frequency domain by the transform module 730, which may be implemented using any invertible transform. For example, in a vertical intra mode, residual pixels, denoted as D(0,j) where j is between 0 and N−1, in the 0-th row may be transformed using an invertible transform. At this time, since residual pixels in other rows have not yet been made available by the prediction module 720, the other rows may be arbitrarily assigned or filled or padded with appropriate pixel values. For example, the other rows may be simply assigned with zero pixel values. After obtaining an N×N block comprising the initial set of residual pixels as well as arbitrarily assigned values, the invertible transform may be applied onto the N×N block to generate a transform coefficient matrix.

To facilitate encoding of other rows in the current block, the transform coefficient matrix may be fed into the inverse transform module 750, which may perform the inverse of the transform module 730 and convert transform coefficients from a frequency domain to a spatial domain. The inverse transform module 750 may generate another set of residual pixels, denoted as D' (0,j) where j is between 0 and N−1. Depending on whether or not the invertible transform is fully reversible, D' (0,j) may be the same with or slightly different from D(0,j). Either way, D'(0,j) may be used by the reconstructed module 760 to generate a set of reconstructed pixels as R(0,j), D'(0,j)+P(0,j). Then, the 0-th row of reconstructed pixels R(0,j) may serve as internal reference pixels to generate a second set (i.e., a 1-st row) of prediction pixels as P(1,j)=R(0,j). A second set of residual pixels D(1,j) may again be generated. Other rows may be assigned with arbitrary values and the constructed N×N block may be transformed and inverse transformed, generating a block containing D'(1,j). D'(1,j) may then serve as internal reference pixels for continuing intra prediction. This iterative process may continue until all residual pixels have been generated for the current block. Certain aspects of this iterative prediction process may be similar to the process in the transform bypass encoding scheme 500, thus the similar aspects will not be further described in the interest of conciseness. The transform (e.g., in transform module 730) may be a one-dimensional "line-transform" either in a vertical or horizontal direction, and the transform may be performed one row or column at a time. Pixel-based prediction may be performed without drift in a transform without quantization scheme if the transform is fully invertible.

After all transform coefficients have been generated for the current block, the transform coefficients may be scanned, and non-zero transform coefficients may be encoded by the entropy encoder 740 into an encoded bitstream. The entropy encoder 740 may be the same or similar with the entropy encoder 530. Prior to transmission from the encoder, the encoded bitstream may be further configured to include other information, such as video resolution, frame rate, block partitioning information (sizes, coordinates), prediction modes, etc., so that the encoded sequence of video frames may be properly decoded.

Figure 8:
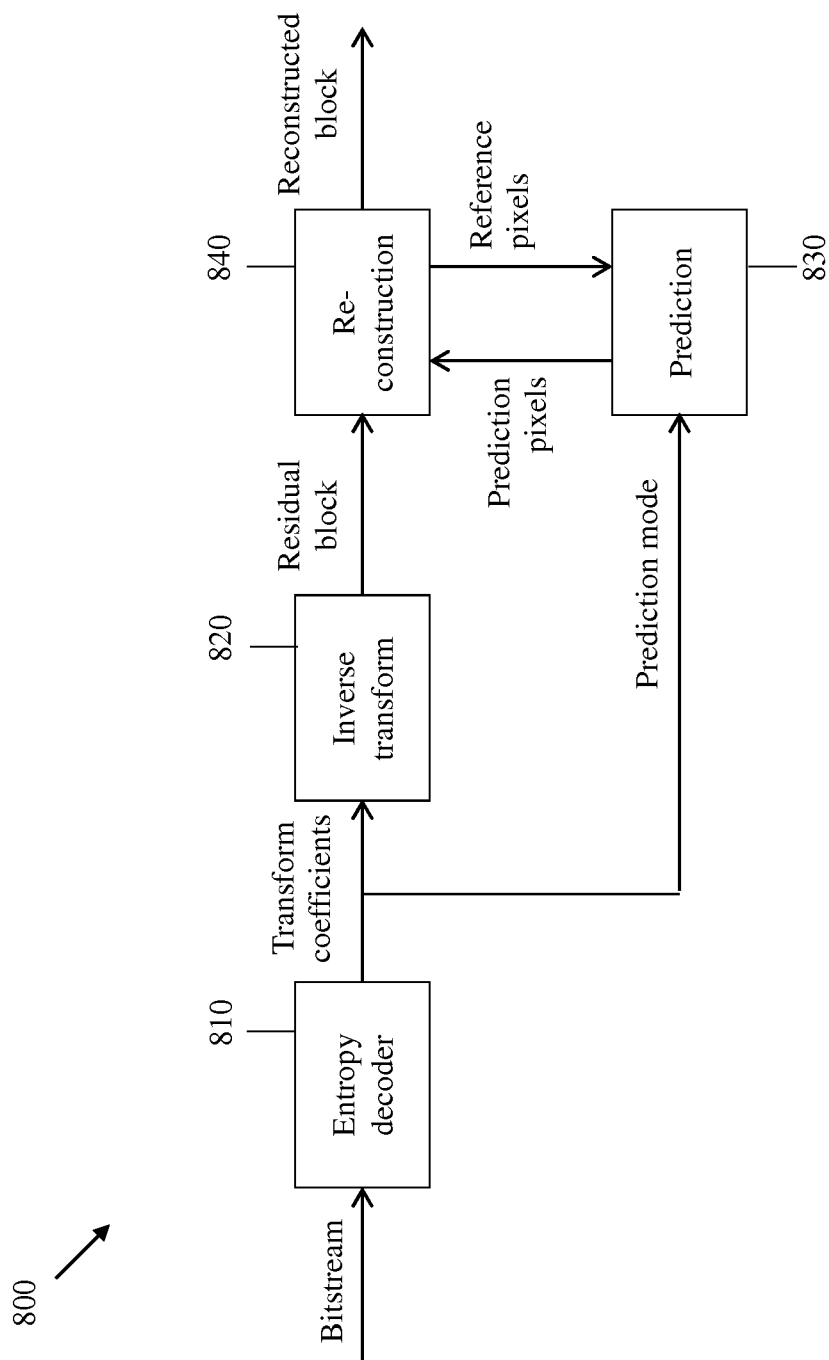
FIG. 8 is a schematic diagram of an embodiment of a transform without quantization decoding scheme.

FIG. 8 illustrates an embodiment of a transform without quantization decoding scheme 800, which may be implemented in a video decoder. The transform bypass decoding scheme 800 may correspond to the transform without quantization encoding scheme 700, and may comprise an entropy decoder 810, an inverse transform module 820, a prediction module 830, and a reconstruction module 840 arranged as shown in FIG. 8. In operation, an encoded bitstream containing information of a sequence of video frames may be received by the entropy decoder 810, which may decode the bitstream to an uncompressed format. The entropy decoder 810 may be the same or similar to the entropy decoder 610 in FIG. 6. After execution of the entropy decoder 810, a matrix of transform coefficients may be generated, which may then be fed into the inverse transform module 820. The inverse transform module 820 may convert the transform coefficients in a frequency domain to residual pixel values in a spatial domain. The inverse transform module 820 may be the same or similar with the inverse transform module 750 in FIG. 7.

For a current block being decoded, a residual block may be generated after the execution of the inverse transform module 820. In addition, information containing a prediction mode of the current block may also be decoded by the entropy decoder 810. Then, based on the prediction mode as well as a plurality of external reference pixels located in one or more previously decoded neighboring blocks, the prediction module 830 may generate an initial set of prediction pixels. Then, the reconstruction module 840 may combine the initial set of prediction pixels with a corresponding set of residual pixels to generate a set of reconstructed pixels. The reconstructed pixels may also serve as reference pixels for decoding of continuing sets of pixels. Specifically, by using the initial set of reconstructed pixels, a second set of prediction pixels may be generated. Thus, the second set of prediction pixels may be added to a second set of residual pixels to obtain a second set of reconstructed pixels. This iterative process may continue until all reconstructed pixels for the current block have been obtained. Then, the decoder may proceed to reconstruct a next block.

Figure 9:
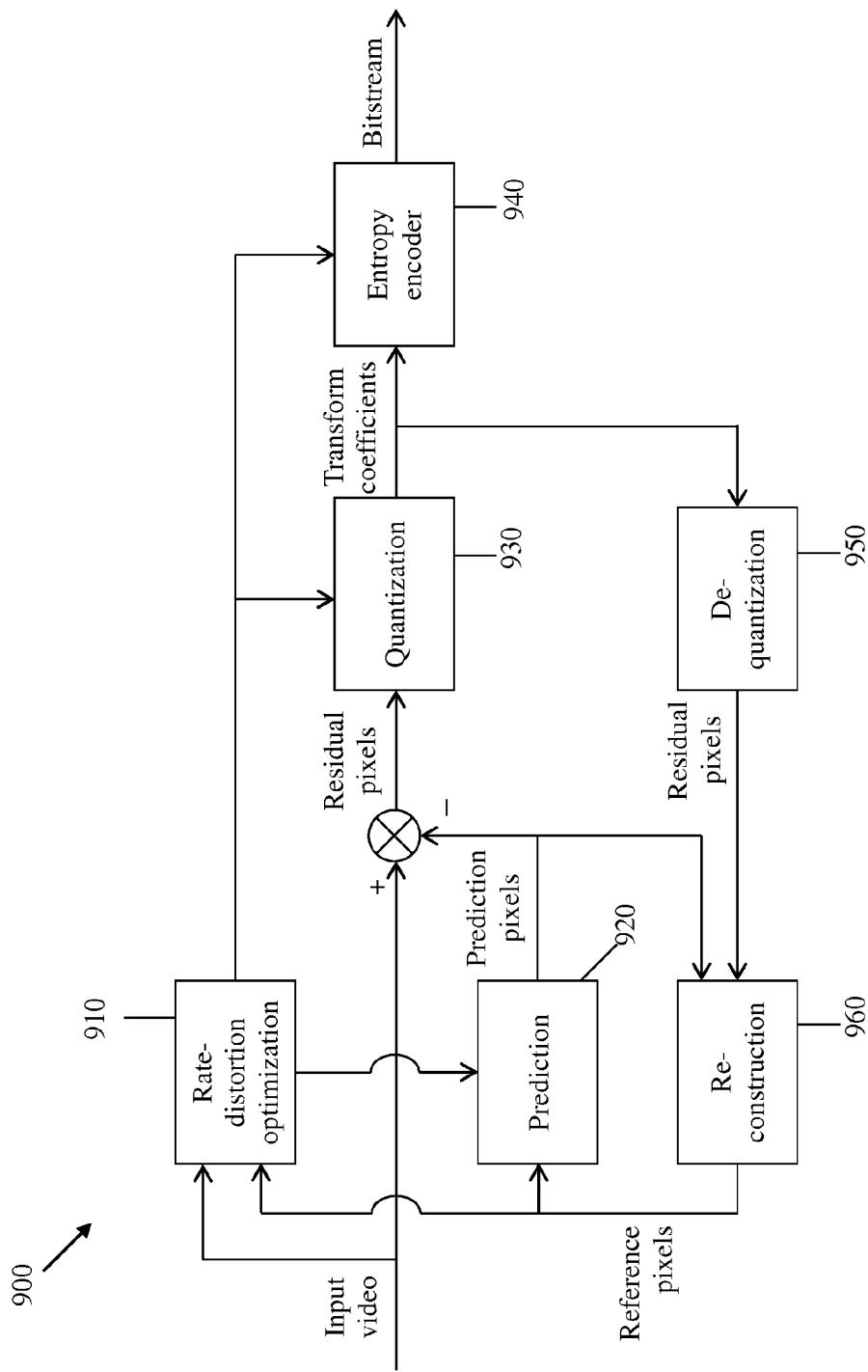
FIG. 9 is a schematic diagram of an embodiment of a quantization without transform encoding scheme.

In use, sometimes it may be desirable to include a quantization step, instead of a transform step, into the coding process. FIG. 9 illustrates an embodiment of a quantization without transform encoding scheme 900, which may comprise a RDO module 910, a prediction module 920, a quantization module 930, an entropy encoder 940, a de-quantization module 950, and a reconstruction module 960. Some aspects of the quantization without transform encoding scheme 900 may be the same or similar to the transform bypass encoding scheme 500 in FIG. 5 or the transform without quantization encoding scheme 700 in FIG. 7, thus the similar aspects will not be further described in the interest of clarity.

The quantization without transform encoding scheme 900 may be implemented in a video encoder, which may receive an input video comprising a sequence of video frames. The RDO module 910 may be configured to control one or more of other modules, and may be the same or similar to the RDO module 510 in FIG. 5. Based on logic decisions made by the RDO module 910, the prediction module 920 may utilize both external and internal reference pixels to generate prediction pixels for a current block. Each prediction pixel ($P(i,j)$) may be subtracted from a corresponding original pixel in the current block, or vice versa, thereby generating a residual pixel. The prediction module 920 may be the same or similar to the prediction module 720 in FIG. 7.

An initial set of residual pixels may be generated by the prediction module 920 based on a plurality of external reference pixels. Then, the initial set of residual pixels may be first quantized or re-scaled by the quantization module 930. Depending on the application, the quantization module 930 may employ any appropriate quantization parameter (QP). For example, in a vertical intra mode, residual pixels, denoted as $D(0,j)$ where j is between 0 and N−1, in the 0-th row may be converted to quantized residual pixels, denoted as $q\_D(0,j)$. The quantization may use equation $q\_D(0,j)=$ floor$(d(0,j)/qp\_scale)$, where qp_scale denotes a quantation step determined by the QP.

To facilitate encoding of other rows in the current block, the initial set of quantized residual pixels may be fed into the de-quantization module 950, which may perform the inverse of the quantization module 930 and recover a scale of the residual pixels. The de-quantization module 950 may generate another set of residual pixels, denoted as $D"(0,j)$ where j is between 0 and N−1 via an equation: $D"(0,j)=q\_D(0,j)*qp\_scale=$floor$(d(0,j)/qp\_scale)*qp\_scale$. $D"$ $(0,j)$, a lossy version of $D(0,j)$, may be used by the reconstructed module 960 to generate a set of reconstructed pixels as $R(0,j)$, $D"(0,j)+P(0,j)$. Then, the 0-th row of reconstructed pixels $R(0,j)$ may serve as internal reference pixels to generate a second set (i.e., a 1-st row) of prediction pixels as $P(1,j)=R(0,j)$. A second set of residual pixels $D(1,j)$ may again be generated, quantized and de-quantized, generating a block containing $D"(1,j)$. $D"(1,j)$ may then serve as internal reference pixels for continuing intra prediction. This iterative process may continue until all residual pixels have been generated for the current block. Certain aspects of this iterative prediction process may be similar to the process in the transform bypass encoding scheme 500, thus the similar aspects will not be further described in the interest of conciseness.

After all quantized residual pixels have been generated for the current block, the quantized residual pixels may be scanned, and non-zero quantized residual pixels may be encoded by the entropy encoder 940 into an encoded bitstream. The entropy encoder 940 may be the same or similar with the entropy encoder 530. Prior to transmission from the encoder, the encoded bitstream may be further configured to include other information, such as video resolution, frame rate, block partitioning information (sizes, coordinates), prediction modes, etc., so that the encoded sequence of video frames may be properly decoded.

Figure 10:
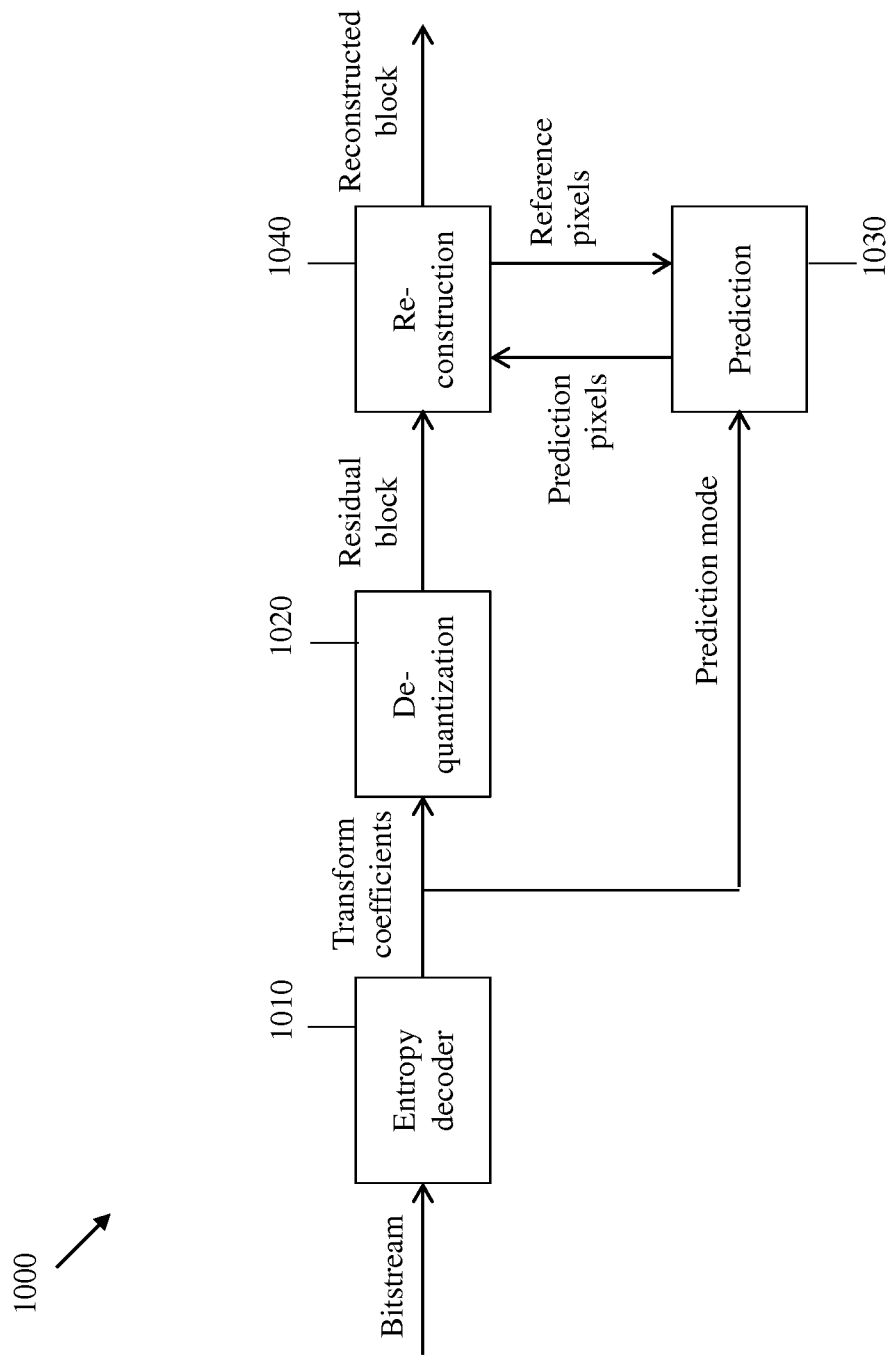
FIG. 10 is a schematic diagram of an embodiment of a quantization without transform decoding scheme.

FIG. 10 illustrates an embodiment of a quantization without transform decoding scheme 1000, which may be implemented in a video decoder. The transform bypass decoding scheme 1000 may correspond to the quantization without transform encoding scheme 900, and may comprise an entropy decoder 1010, a de-quantization module 1020, a prediction module 1030, and a reconstruction module 1040 arranged as shown in FIG. 10. In operation, an encoded bitstream containing information of a sequence of video frames may be received by the entropy decoder 1010, which may decode the bitstream to an uncompressed format. The entropy decoder 1010 may be the same or similar to the entropy decoder 610 in FIG. 6. After execution of the entropy decoder 1010, a block of quantized residual pixels may be generated, which may then be fed into the de-quantization module 1020. The de-quantization module 1020 may be the same or similar with the de-quantization module 950 in FIG. 9.

For a current block being decoded, a residual block may be generated after the execution of the inverse transform module 1020. In addition, information containing a prediction mode of the current block may also be decoded by the entropy decoder 1010. Then, based on the prediction mode as well as a plurality of external reference pixels located in one or more previously decoded neighboring blocks, the prediction module 1030 may generate an initial set of prediction pixels. Then, the reconstruction module 1040 may combine the initial set of prediction pixels with a corresponding set of residual pixels to generate a set of reconstructed pixels. The reconstructed pixels may also serve as reference pixels for decoding of continuing sets of pixels. Specifically, by using the initial set of reconstructed pixels, a second set of prediction pixels may be generated. Thus, the second set of prediction pixels may be added to a second set of residual pixels to obtain a second set of reconstructed pixels. This iterative process may continue until all reconstructed pixels for the current block have been obtained. Then, the decoder may proceed to reconstruct a next block.

Figure 11:
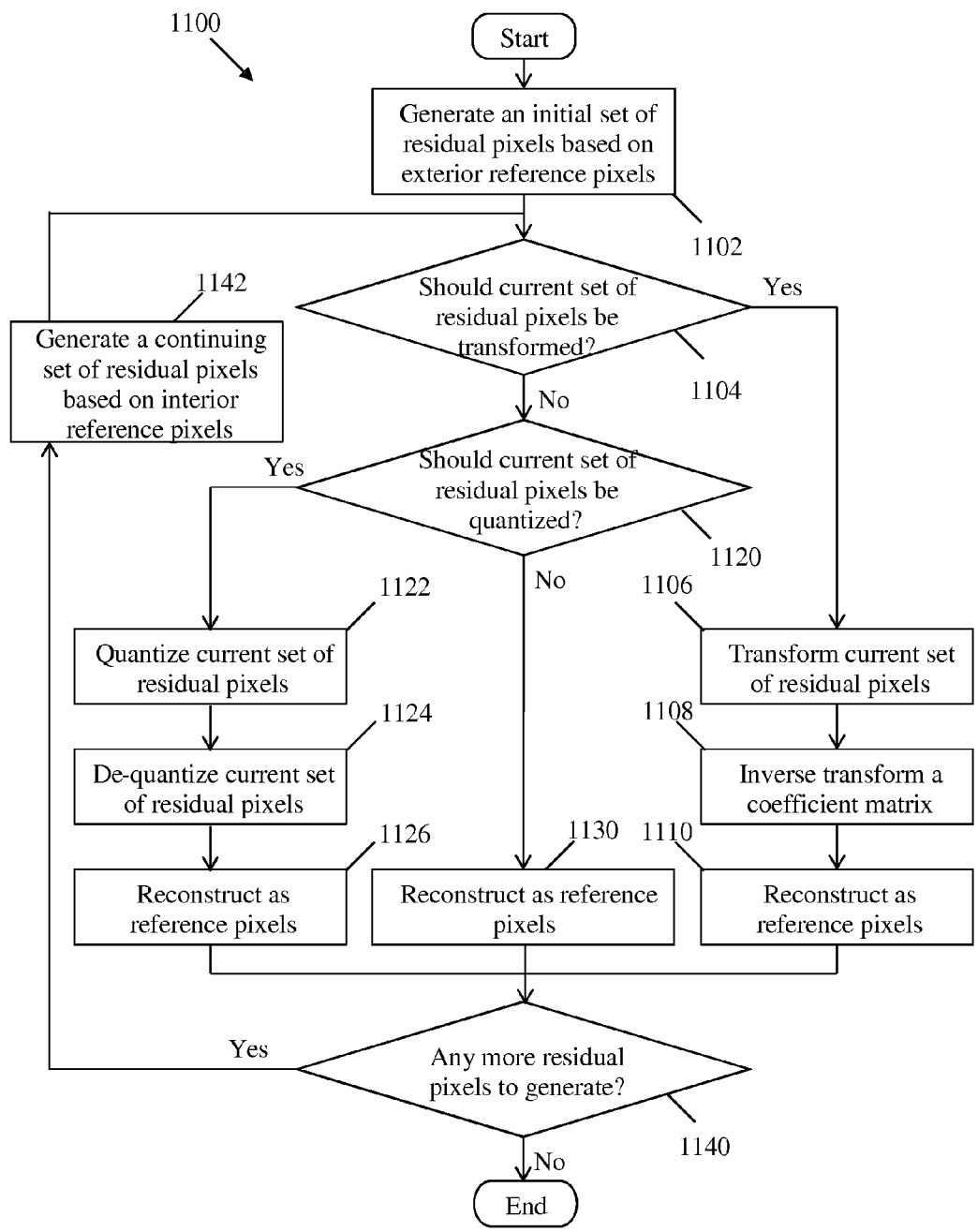
FIG. 11 is a flowchart of an embodiment of a pixel-based intra prediction method.

FIG. 11 illustrates an embodiment of a pixel-based intra prediction method 1100, which may be part of an aforementioned coding scheme. The method 1100 may start in step 1102, where an initial or first set of residual pixels may be generated for a current block. Specifically, an initial set of prediction pixels may be generated based on a plurality of external reference pixels located in a neighboring block. The initial set of prediction pixels may be subtracted from corresponding original pixels of the current block, or vice versa, generating the initial set of residual pixels. Depending on an intra prediction mode, the initial set may be located in a row, a column, or both. For example, in a vertical mode of intra predicting an N×N block, the initial set of residual pixels $D(0,j)=X(0,j)-Z(0,j)$ or $D(0,j)=Z(0,j)-X(0,j)$, where j is between 0 and N−1. Next, in step 1104, the method 1100 may determine if transform should be performed on the set of residual pixels. If the condition in the block 1104 is met, the method 1100 may proceed to step 1106. Otherwise, the method 1100 may proceed to step 1120.

In step 1106, a current set of residual pixels may be transformed into a frequency domain using an invertible transform. Since other residual pixels may not be available yet at this time, arbitrary values may be assigned to other residual pixels. For example, in the vertical mode, when transforming the current set of residual pixels $D(i,j)$, residual pixels in the other rows (i.e., $D(k,j)$, where $k=0, \ldots, N-1$ and $k \neq i$) may be simply assigned with zero pixel values (i.e., $D(k,j)=0$). In the vertical mode, when $i=0$ the current set may be the initial set. By constructing an N×N block comprising the current set of residual pixels as well as other arbitrarily assigned values, the invertible transform may be applied onto the N×N block to generate a transform coefficient matrix. Next, in step 1108, the transform coefficient matrix may be inverse transformed to generate another set of residual pixels $D'(i,j)$, which may be the same or similar to $D(i,j)$. Next, in step 1110, the set of residual pixels $D'(i,j)$ may be combined with the prediction pixels to reconstruct a set of pixels using, for example, equation $R(i,j)=D'(i,j)+P(i,j)$. In the initial set when $i=0$, the set of reconstructed pixels is an initial set $R(0,j)=D'(0,j)+P(0,j)$.

If the method 1100 determines, in the block 704, that transform should not be performed on the set of residual pixels, next in step 1120, the method 1100 may determine if quantization should be performed on the set of residual pixels. If the condition in the block 1120 is met, the method 1100 may proceed to step 1122. Otherwise, the method 1100 may proceed to step 1130. In step 1122, the set of residual pixels may be quantized or reduced in scale to generate a set of quantized residual pixels. The quantization may have a pre-set QP which determines a quantization step. The set of quantized residuals may be expressed as $q\_D(i,j)=\text{floor}(d(i,j)/qp\_scale)$. Next, in step 1124, the set of quantized residual pixels may be de-quantized to recover a scale of the residual pixels. The recovered residual pixels $D''(i,j)$ may be expressed as $D''(0,j)=q\_D(0,j)*qp\_scale=\text{floor}(d(0,j)/qp\_scale)*qp\_scale$, which may be a lossy version of $D(i,j)$. Next, in step 1126, the set of residual pixels $D''(i,j)$ may be combined with the prediction pixels $P(i,j)$ to reconstruct a set of pixels using, for example, equation $R(i,j)=D''(i,j)+P(i,j)$. In the initial set when $i=0$, the set of reconstructed pixels is an initial set $R(0,j)=D''(0,j)+P(0,j)$.

If the method 1100 determines, in the block 1120, that quantization should not be performed on the set of residual pixels, next in step 1130, the set of residual pixels $D(i,j)$ may be combined with the prediction pixels $P(i,j)$ to reconstruct a set of pixels using equation $R(i,j)=D(i,j)+P(i,j)$. In this case, since no distortion or information loss is introduced in the reconstruction process, it may be true that $R(i,j)=Z(i,j)$. Specifically, in the initial set when $i=0$, the set of reconstructed pixels is an initial set $R(0,j)=Z(0,j)=D(0,j)+P(0,j)$.

Next, in step 1140, the method 1100 may determine if there are more residual pixels to be generated. If the condition in the block 1120 is met, the method 1100 may proceed to step 1142. Otherwise, the method 1100 may end. In step 1142, a continuing or next set of residual pixels may be generated. Specifically, a continuing set of prediction pixels may be generated based on a plurality of internal reference pixels, which may be reconstructed pixels located in a row and/or a column preceding the current row and/or column according to an intra prediction mode. The continuing set of prediction pixels may be subtracted from corresponding original pixels of the current block, or vice versa, generating the continuing set of residual pixels. For example, in the vertical mode, $D(i,j)=R(i-1,j)-Z(i,j)$ or $D(i,j)=Z(i,j)-R(i-1,j)$. After generating the continuing set of residual pixels, the method 1100 may return to step 1104.

Eventually, all residual pixels have been obtained for the current block and the method 1100 may end. It should be understood that the method 1100 may only include a portion of all necessary coding steps, thus other steps, such as scanning, transmitting, and filtering, may also be incorporated into the encoding process wherever appropriate. Additionally, the method 1100 may not necessarily need to implement all of the listed steps to realize intra prediction of a block. For example, if desired, the decisions block 1120 may be removed from the method 1100, thus the method 1100 may be configured to always or never perform quantization of residual pixels.

Figure 12:
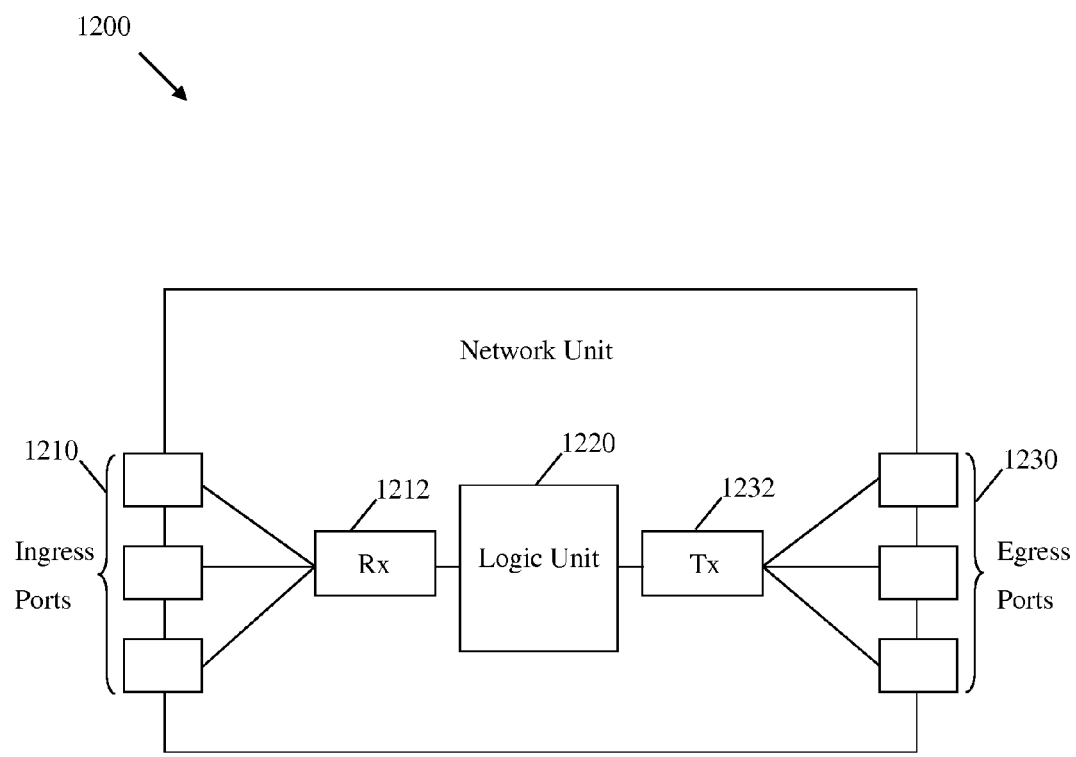
FIG. 12 is a schematic diagram of an embodiment of a network unit.

FIG. 12 illustrates an embodiment of a network unit 1200, which may comprise an encoder and decoder (codec) that processes video blocks as described above, for example, within a network or system. The network unit 1200 may comprise a plurality of ingress ports 1210 and/or receiver units (Rx) 1212 for receiving data from other network units or components, logic unit or processor 1220 to process data and determine which network unit to send the data to, and a plurality of egress ports 1230 and/or transmitter units (Tx) 1232 for transmitting data to the other network units. The logic unit or processor 1220 may be configured to implement any of the schemes described herein, such as the transform bypass encoding scheme 500, the transform without quantization encoding scheme 700, the quantization without transform encoding scheme 900, and the pixel-based intra prediction method 1100. The logic unit 1220 may be implemented using hardware, software, or both.

Figure 13:
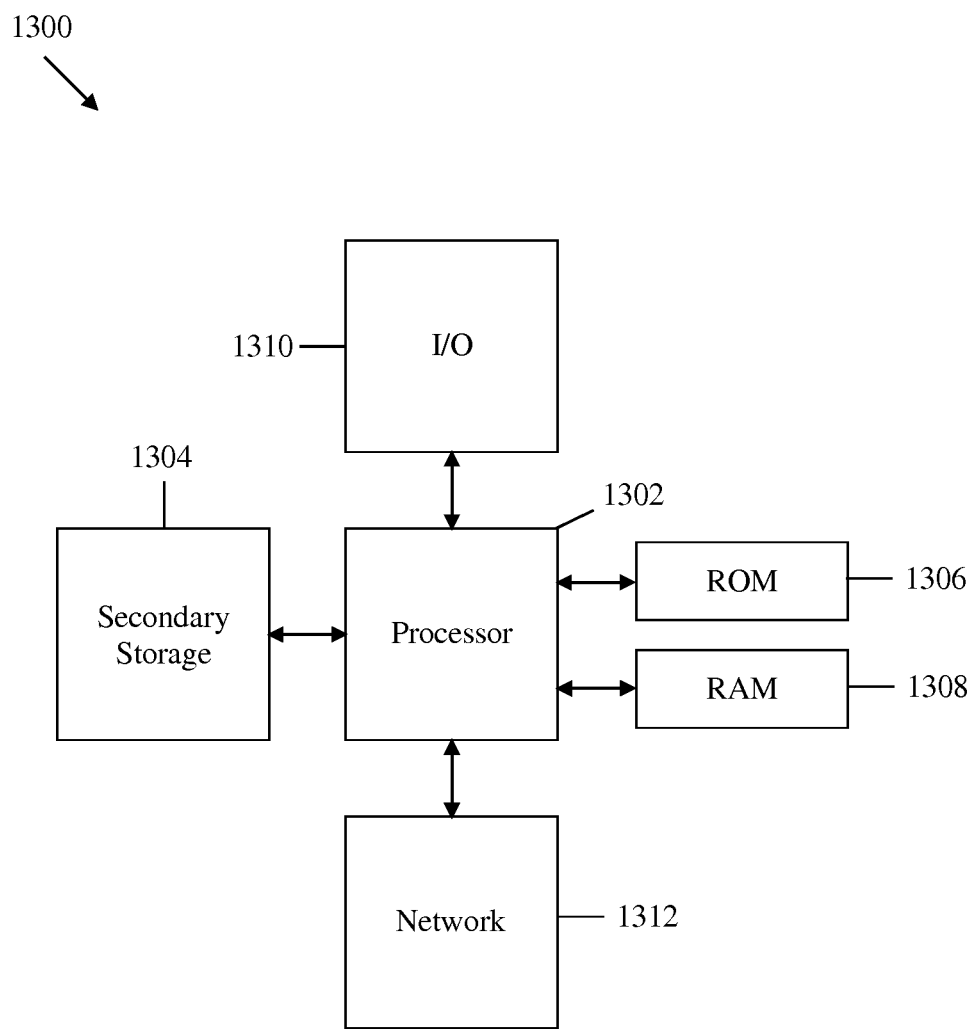
FIG. 13 is a schematic diagram of a general-purpose computer system.

The schemes described above may be implemented on any general-purpose network component, such as a computer or network component with sufficient processing power, memory resources, and network throughput capability to handle the necessary workload placed upon it. FIG. 13 illustrates a schematic diagram of a typical, general-purpose network component or computer system 1300 suitable for implementing one or more embodiments of the methods disclosed herein, such as the transform bypass encoding scheme 500, the transform without quantization encoding scheme 700, the quantization without transform encoding scheme 900, and the pixel-based intra prediction method 1100. The general-purpose network component or computer system 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. Although illustrated as a single processor, the processor 1302 is not so limited and may comprise multiple processors. The processor 1302 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1302 may be configured to implement any of the schemes described herein, including the transform bypass encoding scheme 500, the transform without quantization encoding scheme 700, the quantization without transform encoding scheme 900, and the pixel-based intra prediction method 1100. The processor 1302 may be implemented using hardware, software, or both.

The secondary storage 1304 is typically comprised of one or more disk drives or tape drives and is used for non-volatile storage of data and as an over-flow data storage device if the RAM 1308 is not large enough to hold all working data. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small memory capacity relative to the larger memory capacity of the secondary storage 1304. The RAM 1308 is used to store volatile data and perhaps to store instructions. Access to both the ROM 1306 and the RAM 1308 is typically faster than to the secondary storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a memory;
    a processor coupled to the memory and configured to:
        receive a video frame comprising a current block, wherein the current block comprises a plurality of original pixels;
        compute a plurality of reconstructed pixels based on the original pixels; and
        use an intra prediction mode to generate sets of prediction pixels in sequence one of vertically and horizontally, but not both, for the current block, wherein the sets of prediction pixels are each smaller than the current block and based on a set of reconstructed pixels in the plurality of reconstructed pixels, wherein a set of internal reference pixels from within the current block immediately precedes each set of prediction pixels generated in sequence after an initial set of prediction pixels such that a prediction distance remains one pixel regardless of a size of the current block,
        select the intra prediction mode from a plurality of available intra prediction modes;

compute a difference between each of the set of prediction pixels and each of a corresponding set of original pixels in the plurality of original pixels to generate a set of residual pixels, wherein computing the set of reconstructed pixels is based on the set of prediction pixels and the set of residual pixels, wherein the set of reconstructed pixels are used to generate a second set of prediction pixels, wherein each of the s a prediction pixels is located in a first position before each of the second set of prediction pixels is located in a second position according to a prediction order of the intra prediction mode;

quantize the set of residual pixels to generate a set of quantized residual pixels;

de-quantize the set of quantized residual pixels to generate a second set of residual pixels; and combine the second set of residual pixels with the set of prediction pixels to generate the set of reconstructed pixels, wherein the plurality of reconstructed pixels comprises an initial set of reconstructed pixels, wherein the initial set of reconstructed pixels is based on an initial set of prediction pixels, wherein the intra prediction mode is used to generate the initial set of prediction pixels based on a set of external reference pixels located in one or more neighboring blocks, wherein the one or more neighboring blocks have been coded before the current block, wherein $d(i,j)$ denotes the set of residual pixels, wherein i and j are integers between 0 and N−1, wherein N is a size of the current block, wherein $d''(i,j)$ denotes the second set of residual pixels, wherein floor identifies a location of the set of residual pixels relative to the second set of residual pixels, and wherein qp_scale denotes a quantization step determined by a quantization parameter (QP), and wherein $d''(i,j)=\text{floor}(d(i,j)/qp\_scale)*qp\_scale$.

2. The apparatus of claim 1, wherein the plurality of reconstructed pixels are equal to the plurality of original pixels.

3. The apparatus of claim 1, wherein the processor is further configured to:

perform a transform on the set of residual pixels to generate a plurality of transform coefficients;

perform an inverse transform on the plurality of transform coefficients to generate a second set of residual pixels; and combine the second set of residual pixels with the set of prediction pixels to generate the set of reconstructed pixels.

4. The apparatus of claim 3, wherein the transform and inverse transform are invertible.

5. The apparatus of claim 4, wherein the transform is performed on a matrix comprising the set of residual pixels, wherein other positions of the matrix different from the set of residual pixels are assigned with arbitrary values, and wherein the arbitrary values are zero pixel values.

6. The apparatus of claim 1, wherein the current block is a prediction unit (PU).

7. The apparatus of claim 1, wherein the intra prediction mode is a vertical mode.

8. The apparatus of claim 1, wherein the processor is further configured to encode the set of residual pixels to generate encoded data.

9. A method comprising:

receiving a video frame comprising a current block, wherein the current block comprises a plurality of original pixels;

computing a plurality of reconstructed pixels based on the original pixels;

using an intra prediction mode to generate sets of prediction pixels in sequence one of vertically and horizontally, but not both, for the current block, wherein the sets of prediction pixels are each smaller than the current block and based on a set of reconstructed pixels in the plurality of reconstructed pixels, and wherein a set of internal reference pixels from within the current block immediately precedes each set of prediction pixels generated in sequence after an initial set of prediction pixels such that a prediction distance remains one pixel regardless of a size of the current block;

selecting the intra prediction mode from a plurality of available intra prediction modes;

computing a difference between each of the set of prediction pixels and each of a corresponding set of original pixels in the plurality of original pixels to generate a set of residual pixels, wherein computing the set of reconstructed pixels is based on the set of prediction pixels and the set of residual pixels, wherein the set of reconstructed pixels are used to generate a second set of prediction pixels, wherein each of the set of reconstructed pixels is located in a first position before each of the second set of prediction pixels is located in a second position according to a prediction order of the intra prediction mode;

quantizing the set of residual pixels to generate a set of quantized residual pixels;

de-quantizing the set of quantized residual pixels to generate a second set of residual pixels; and combining the second set of residual pixels with the set of prediction pixels to generate the set of reconstructed pixels, wherein the plurality of reconstructed pixels comprises an initial set of reconstructed pixels, wherein the initial set of reconstructed pixels is based on an initial set of prediction pixels, wherein the intra prediction mode is used to generate the initial set of prediction pixels based on a set of external reference pixels located in one or more neighboring blocks, wherein the one or more neighboring blocks have been coded before the current block, wherein $d(i,j)$ denotes the set of residual pixels, wherein i and j are integers between 0 and N−1, wherein N is a size of the current block, wherein $d''(i,j)$ denotes the second set of residual pixels, wherein floor identifies a location of the set of residual pixels relative to the second set of residual pixels, wherein qp_scale denotes a quantization step determined by a quantization parameter (QP), and wherein $d''(i,j)=\text{floor}(d(i,j)/qp\_scale)*qp\_scale$.

10. The method of claim 9, wherein the plurality of reconstructed pixels are equal to the plurality of original pixels.

11. The method of claim 9, further comprising:

performing a transform on the set of residual pixels to generate a plurality of transform coefficients;

performing an inverse transform on the plurality of transform coefficients to generate a second set of residual pixels; and combining the second set of residual pixels with the set of prediction pixels to generate the set of reconstructed pixels.

12. The method of claim 11, wherein the transform and inverse transform are invertible.

13. The method of claim 12, wherein the transform is performed on a matrix comprising the set of residual pixels, wherein other positions of the matrix different from the set of residual pixels are assigned with arbitrary values, and wherein the arbitrary values are zero pixel values.

14. The method of claim 9, wherein the current block is a prediction unit (PU).

15. The method of claim 9, wherein the intra prediction mode is a vertical mode.

16. The method of claim 9, further comprising encoding the set of residual pixels to generate encoded data.

* * * * *

UNITED STATES PATENT AND TRADEMARK OFFICE
CERTIFICATE OF CORRECTION

| | | |
|---|---|---|
| PATENT NO. | : 9,516,349 B2 | |
| APPLICATION NO. | : 13/546848 | |
| DATED | : December 6, 2016 | |
| INVENTOR(S) | : Gao et al. | |

It is certified that error appears in the above-identified patent and that said Letters Patent is hereby corrected as shown below:

In the Claims

Column 17; Line 9, Claim 1 should read:
each of the set of prediction pixels is located in a first Signed and Sealed this
Twenty-first Day of March, 2017

Michelle K. Lee
*Director of the United States Patent and Trademark Office*